(12) United States Patent
Copeland et al.

(10) Patent No.: US 6,823,360 B2
(45) Date of Patent: Nov. 23, 2004

(54) COFETCHING IN A COMMAND CACHE

(75) Inventors: George P. Copeland, Austin, TX (US); Michael H. Conner, Austin, TX (US); Gregory A. Flurry, Austin, TX (US)

(73) Assignee: International Business Machines Corp., Armonk, NY (US)

(*) Notice: Subject to any disclaimer, the term of this patent is extended or adjusted under 35 U.S.C. 154(b) by 907 days.

(21) Appl. No.: 09/740,399

(22) Filed: Dec. 18, 2000

(65) Prior Publication Data
US 2002/0116448 A1 Aug. 22, 2002

(51) Int. Cl.[7] .............................................. G06F 15/16
(52) U.S. Cl. ........................ 709/203; 711/118; 711/125
(58) Field of Search .......................... 709/203; 711/118, 711/125

(56) References Cited

U.S. PATENT DOCUMENTS

| 4,638,431 | A | 1/1987 | Nishimura |
| 5,025,365 | A | 6/1991 | Mathur et al. |
| 5,136,696 | A | 8/1992 | Beckwith et al. |
| 5,371,896 | A | 12/1994 | Gove et al. |
| 5,511,212 | A | 4/1996 | Rockoff |

(List continued on next page.)

FOREIGN PATENT DOCUMENTS

| EP | 0 328 849 | 8/1989 |
| EP | 0 959 406 | 11/1999 |

OTHER PUBLICATIONS

Copeland et al., "Web Caching with Dynamic Content," May 2000, pp. 1–35.
"Oracle9i Application Server Web Caching," Oct. 2000, pp. 1–7.
"Caching Live Business Content," © 2000 Persistence Software, Inc., pp. 1–11.
Pean et al., "Effective Mechanisms to Reduce the Overhead of Migratory Sharing for Linked–Based Cache Coherence Protocols in Clustering Multiprocessor Architecture," © 1998 IEEE, pp. 511–518.

Primary Examiner—Jack Lane
(74) Attorney, Agent, or Firm—Kevin L. Daffer; Conley Rose P.C.; Jeffrey S. LaBaw, IBM

(57) ABSTRACT

A system and method are disclosed, according to which, the responsiveness of client/server-based distributed web applications operating in an object-oriented environment may be improved by cofetching read only commands. In an exemplary embodiment, the system and method are implemented by defining special preExecute and postExecute methods of cacheable commands. The preExecute method of a requested command may be invoked to execute secondary commands and then return them to the requesting client. The postExecute method of a requested command may be invoked to place the returned commands in a cache, along with the requested command. In this manner, a single request can be used to execute, retrieve and cache multiple related commands. Cofetched commands are designated by the application developer when the requested command and its associated methods are created, and may be chosen based on their anticipated use in conjunction with the requested command. For example, a log-on command may cofetch other user authentication commands, since they are generally required immediately after the user logs on. Cofetching avoids the need to issue a separate request for every command.

19 Claims, 5 Drawing Sheets

U.S. PATENT DOCUMENTS

| | | |
|---|---|---|
| 5,519,862 A | 5/1996 | Schaeffer et al. |
| 5,524,190 A | 6/1996 | Schaeffer et al. |
| 5,551,000 A | 8/1996 | Tan et al. |
| 5,598,551 A | 1/1997 | Barajas et al. |
| 5,625,789 A | 4/1997 | Hesson et al. |
| 5,706,435 A | 1/1998 | Barbará et al. |
| 5,717,897 A | 2/1998 | McCrory |
| 5,745,728 A | 4/1998 | Genduso et al. |
| 5,819,301 A | 10/1998 | Rowe et al. |
| 5,822,749 A * | 10/1998 | Agarwal .................... 707/2 |
| 5,860,110 A | 1/1999 | Fukui et al. |
| 5,961,602 A | 10/1999 | Thompson et al. |
| 5,974,421 A | 10/1999 | Krishnaswamy et al. |
| 6,000,012 A | 12/1999 | Freerksen et al. |
| 6,014,698 A | 1/2000 | Griffiths |
| 6,021,426 A | 2/2000 | Douglis et al. |
| 6,038,601 A | 3/2000 | Lambert et al. |
| 6,052,698 A | 4/2000 | Bennett et al. |
| 6,457,103 B1 | 9/2002 | Challenger et al. |
| 6,507,891 B1 | 1/2003 | Challenger et al. |
| 6,557,076 B1 | 4/2003 | Copeland et al. |
| 6,574,715 B2 | 6/2003 | Challenger et al. |
| 6,584,548 B1 * | 6/2003 | Bourne et al. ............... 711/134 |
| 6,615,235 B1 | 9/2003 | Copeland et al. |
| 2002/0143868 A1 * | 10/2002 | Challenger et al. ......... 709/203 |

* cited by examiner

COFETCHING IN A COMMAND CACHE

RELATED APPLICATIONS

This application is related to the following copending U.S. patent applications, filed on even date herewith: "Command Caching," "JSP Composition in a Cache for Web Applications with Dynamic Content," "Integrated JSP and Command Cache for Web Applications with Dynamic Content," "Automatic Invalidation Dependency Capture in a Web Cache with Dynamic Content," "Detecting and Handling Affinity Breaks in Web Applications", and "Batching of Invalidations and New Values in a Web Cache with Dynamic Content," all by George P. Copeland, Michael H. Conner and Greg Flurry.

BACKGROUND OF THE INVENTION

1. Field of the Invention

This invention is related to the field of network servers and, more particularly, to the use of cache memory to enhance network server performance.

2. Description of the Related Art

Internet traffic is growing at a rate that greatly exceeds increases in the number of users or the number of transactions. A major factor in this growth is the changing nature of Internet websites themselves. Formerly, web pages comprised mainly static content, such as text, images and links to other sites. The extent of the user's interaction with the website was to occasionally download an HTML page. And, since the content was the same regardless of who requested the page, it was comparatively simple for the web server to support numerous users. The present trend however, is toward interactive websites in which the content and appearance of the website change in response to user input. This is particularly true for e-commerce sites, which support online product selection and purchasing. Such sites are distinguished from earlier websites by their greater dynamic content. A familiar example of this is the "online catalog" provided at many Internet business sites. Each customer logged onto the site to make a purchase has the opportunity to browse the catalog, and even peruse detailed information on thousands of products. Seemingly, the web server must maintain and update a unique web page for each shopper. Internet users enjoy the convenience of such customizable, interactive websites, and customer expectations will undoubtedly provide an impetus for further use of dynamic content in web pages.

The burgeoning use of dynamic content in Internet web pages causes a problem however. Today's e-commerce sites are characterized by extremely high "browse-to-buy ratios". For shopping sites, a typical ratio is 60 interactions that do not update permanent business records ("requests", or "queries") to each one that does ("transactions")—browsing a product description is an example of a request, while making a purchase exemplifies a transaction. One effect of the increasing prevalence of dynamic content is that, although the number of transactions is growing at a predictable (and manageable) rate, the number of requests is growing explosively. The high user-interactivity of modern dynamic content-based web pages is responsible for the large number of requests per transaction. Dynamic content-based pages must be executed for each user request, to update the user's browser screen in response to his input. This results in a tremendous amount of content that must be prepared and conveyed to the user during a single session.

Dealing with the sheer volume of Internet traffic may impose an inordinate financial burden on the e-business. User expectations compel the site provider to provide dynamic web content promptly in response to their requests. If potential customers perceive the website as too slow, they may cease visiting the site, resulting in lost business. The obvious way for a website to meet the increasing demand for information by potential customers is to augment its server-side hardware—i.e. add more computers, routers, etc. But this solution may be prohibitively expensive, and a more cost effective approach is preferable.

One such approach is caching, a technique commonly employed in digital computers to enhance performance. The main memory used in a computer for data storage is typically much slower than the processor. To accommodate the slower memory during a data access, wait states are customarily added to the processor's normal instruction timing. If the processor were required to always access data from the main memory, its performance would suffer significantly. Caching utilizes a small, but extremely fast memory buffer, and takes advantage of a statistical characteristic known as "data locality" to overcome the main memory access bottleneck. Data locality refers to the common tendency for consecutive data accesses to involve the same general region of memory. This is sometimes stated in terms of the "80/20" rule—i.e. 80% of the data accesses are to the same 20% of memory.

The following example, although not web-related, illustrates the benefits of caching in general. Assume one has a computer running a program to multiply two large arrays of numbers, and wants to consider ways the computer might be modified to allow it to run the program faster. The most obvious modification would be to increase the speed of the processor—but this helps only to a point. Each individual multiply operation in the program requires the processor to fetch two operands from memory, compute the product, and then write the result back to memory. At higher processor speeds, as the time required for the computation becomes less significant, the limiting factor is the time required for the processor to interact with memory. Faster memory would seem to be called for, but the use of high-speed memory throughout the computer is too expensive to be practical. Fortunately, the matrix multiplication program exhibits high data locality, since the elements of each of the two input arrays occupy consecutive addresses within a certain range of memory. Therefore, instead of using high-speed memory everywhere in the computer, a small amount of it is employed as a cache. At the start of the program, the input arrays from the main memory are transferred to the cache buffer. While the program executes, the processor fetches operands from the cache, and writes back corresponding results to the cache. Since data accesses use the high-speed cache, the processor is able to execute the program much faster than if it had used main memory. In fact, the use of cache results in a speed improvement nearly as great as if the entire main memory were upgraded, but at a significantly lower cost. Note that a cache system is beneficial only in situations where the assumption of data locality is justified—if the processor frequently has to go outside the cache for data, the speed advantage of the cache disappears.

Another issue connected with the use of a data cache is "cache coherency." As described above, data are typically copied to a cache to permit faster access. Each datum in the cache is an identical copy of the original version in main memory. A problem can arise if one application within the computer accesses a variable in main memory, and another application accesses the copy in the cache. If either version of the variable is changed independently of the other, the cache loses coherency—a potentially harmful result. For example, if the variable is a pointer to critical operating system data, a fatal error may occur. To avoid this, the state of the cache must be monitored. Then, when data in the cache is modified, the "stale" copies in the main memory are temporarily invalidated until they can be updated. An important aspect of any cache-equipped system is a mechanism to maintain cache coherency.

As it turns out, web traffic is well suited to caching. As mentioned above, the majority of e-commerce Internet traffic is from the server to the user, rather than vice-versa. In most cases, the user requests information from the website, which must be culled from the website database. Relatively infrequently, the user sends information to the website, which is entered into the website database. Because often, many users request the same information, it is more convenient to cache the information at some point than to repeatedly retrieve it from the database. Caching dynamic web content can improve the responsiveness of the website without a heavy investment in servers and other hardware.

A major consideration for the suitability of caching is the frequency with which the web content changes. Caching generally becomes feasible as the access rate increases and the update rate decreases—i.e. the user frequently reads from the database, and infrequently writes to the database. If a number of users frequently request the same content, it is much more efficient to fetch it from cache than to repeatedly retrieve it from the database. However, when the content changes almost constantly, the cache must continually be refreshed and provides no advantage. User requests, which update the database, are not cacheable.

FIG. 1 illustrates the hierarchy existing between a website and its users. Each of the web servers, database server and browser clients shown in FIG. 1 is a computer, comprising a central processor, random access memory (RAM), read only memory (ROM), hard disk drive (or other mass storage device), and a network adapter. Those of ordinary skill in the art will appreciate that the exact configuration of the components represented in FIG. 1 may vary, depending on the system implementation. In FIG. 1, the Internet boundary 18 is indicated by a dashed line. The numerous users accessing the website on their Internet browsers are shown above the dashed line, while everything storage system 10. Compared to semiconductor memory, disk drives are cheap, have a large storage capacity, and are non-volatile; but they are also much slower. Therefore, it is desirable to avoid frequent access to the disk storage while users access the website. The database is managed by database server 12, which mediates all information entered into the database or retrieved from it. The next level in the hierarchy comprises the web servers 14a–c, that actually supply HTML code over the Internet 18. Internet traffic to and from the browser clients 20a–c is directed by dispatcher 16, which distributes the workload among the web servers 14a–c on an equal basis. Within this hierarchy, the optimum level at which to cache dynamic web content depends on both the nature of the content, and the regularity with which that content must be updated.

Note that each level separating the client from the cache adds to the latency in the perceived response time. For example, if the desired web content were cached in one of the web servers 14a–c, it would be conveyed to the user's browser 20a–c more quickly than if it were cached in the database server 12, and had to be retrieved by a web server before it could be delivered to the browser. Furthermore, it is generally more efficient for a web server (14a, for example) to obtain cached content from one of its fellow web servers (14b or 14c) than for it to fetch it from the database server 12. Therefore, the web servers are closely coupled, and employ their combined caches as a shared resource ("cluster cache").

The format of web pages containing static text and graphic content is typically specified using HTML (HyperText Markup Language). The markup consists of special codes (often called "tags"), which control the display of words and images when the page is read by an Internet browser, such as Internet Explorer, or Netscape. However, Java Server Pages (JSPs) and servlets are more suitable for modern dynamic content-based web pages. In addition to standard HTML, a JSP may contain Java tags—small programs written in the Java programming language. Java tags are specified on the web page and run on the web server to modify the web page before it is sent to the user who requested it. JSPs and servlets can be nested—i.e. one JSP or servlet can call another. A JSP or servlet called by another JSP or servlet is referred to as "nested" or "embedded." A JSP or servlet can also contain commands that deal with either the visual format of the page (display commands), or its content (data commands). In the first case, the output property of the command is HTML, and in the second case, it is data. Thus, a JSP may call a command to get data that is already formatted as HTML, or it may call a command that formats "raw" data into HTML.

It will be obvious to one skilled in the art that other types of server pages, e.g., Microsoft's Active Server Pages (ASPs), can also be embedded. Therefore, although a particular embodiment of the system and method disclosed herein deals with JSPs, said system and method are not restricted to this embodiment.

A display command that presents data on a web page is dependent on that data, in the sense that, if the data changes, the command must be invalidated so a new request for it will re-execute it the new data, so the change appears on the page. Consequently, if the display command is cached, it must be invalidated whenever the data upon which it depends is updated. If the command is called from within a cached JSP (e.g., items 62 and 70 in FIG. 2), the JSP is invalidated. Since it is possible for commands to call other commands, and for JSPs to be nested, the chain of dependency can become quite intricate. The caching logic must track these dependencies so that it invalidates the appropriate cache entries whenever the underlying data changes.

Granularity is a characteristic of web pages that is critical to an efficient caching strategy. The content of a web page is comprised of several components, some of which may change frequently, while others are relatively static. Therefore, while it is often impossible to cache an entire page (because it contains components that are too volatile), by caching some of its components one can still beneficially reduce database access. The granularity of a web page may be described in terms of "fragments". As used throughout this document, the term "fragment" refers to an HTML page, or a constituent of an HTML page. Each fragment is associated with a visible entity on the web page. A fragment can be created by executing an HTTP request for a JSP file, by calling a JSP from within another JSP, or by executing a command. The following example, which refers to FIG. 2, illustrates a web page composed of fragments.

FIG. 2 represents a product display web page, comprising dynamic content fragments 50 and data 52. The top-level fragment is a Java Server Page (JSP) 54, which contains five child fragments, 56–64. Dynamic content data 66–70 are associated with four of child fragments, as discussed in greater detail below. The heavy border around certain fragments or data indicates that they are cached. Note that the child fragments are arranged from left to right in order of increasing rate of change in their underlying data. The product .gif URL 56 is a link to an image of the product, and is an output property of the product data command 66, which obtains the image from a database. A formatted table contains a detailed description of the product, and is the output property of display command 58. Because it is used by both the .gif URL 56 and the product display command 58, product data command 66 is cached. Since the product data changes only on a weekly basis, it makes good sense to cache it. This prevents having to retrieve the data from the database each time a prospective customer browses the product web page to peruse the product information. The product display command 58 is cached, since it requires formatting by the server, but .gif URL 56 does not.

A fragment which displays a personalized greeting 60 uses a shopper name fetched from the database by the shopper data command 68. This greeting changes often (for every user), but it is still helpful to cache it, since a given shopper name will be reused over the course of a session by the same user. Note that the greeting fragment 60 does not have to be cached, since no formatting of the shopper name is performed.

A JSP 62 creates an abbreviated shopping cart, calling a shopping cart data command 70 to retrieve the shopping cart data from the database. The shopping cart JSP creates an HTML table to display the data. This content will change even more frequently than the personalized greeting 60, since it must be updated every time the shopper adds something to his cart. Nevertheless, if the shopping cart appears on every page returned to the shopper, it is more efficient to cache the JSP than to retrieve the same data each time the cart is displayed.

An advertisement appearing on the web page displays a URL, which changes each time the page is requested. This is too high an update rate to benefit from caching the associated data command 64. This example illustrates that, although the web page is too volatile to be cached in its entirety, fragment granularity still permits portions of the page to be cached. It is also evident that various types of web content benefit to different degrees from the use of cache.

Not only the content, but the location of the cache, influence the effectiveness of a web cache. Web caches may be broadly categorized as either internal or external. An internal cache is part of the web server itself (item 12 in FIG. 1). External caches can be deployed anywhere between the web server and the Internet boundary (item 18 in FIG. 1). Each type has its own advantages. An external cache can be highly cost effective. It is common to implement external caches in dedicated computers, which, because they don't have to maintain an operating system, multiple active tasks, etc., can be optimized for this purpose. Moreover, external caches are closer to the client, which in many cases allows them to be more responsive than a server-side cache. On the other hand, an internal cache is able to exploit the fragment and data granularity of a page and cache its less volatile portions. It is easier to implement access control with an internal cache, so that access to certain pages can readily be restricted to specific groups or individuals. Furthermore, an internal cache can be equipped with statistics-tracking capability; this could be used, for example, to monitor the number of customers visiting a particular site. Ideally, a web server with an internal cache can be used to control the external caches. The server could then "push" selected content to the external caches, or invalidate content as needed.

Caching of dynamic web content can improve the responsiveness of an e-commerce website, without incurring the high cost of additional servers. Web caching performance depends on a number of factors. One of these is cache capacity, which is the number of cacheable entries that can be stored in a given cache. A second factor is the frequency with which content must be retrieved from the database. Website performance would improve if cache requests could be satisfied while making fewer database accesses. A third factor is the speed with which cached content is actually conveyed to the requesting client browser. As discussed above, this often depends on the separation between the cache and the client. A fourth factor affecting performance is the data dependency tracking logic, which invalidates all dependent cached content when underlying data are updated. Any improvement in the efficiency with which these (potentially complex) dependencies can be managed would enhance website performance.

SUMMARY OF THE INVENTION

The need for improved responsiveness of an e-commerce website is addressed by the techniques disclosed herein for caching dynamic web content. Under the proper circumstances, caching of dynamic content can shorten the average response time to user requests, without a costly investment in additional servers. Caching is most effective with "read-only" web traffic—i.e. the direction of information transfer is predominantly from the website to the user. Fortunately, this is the case for most e-business websites.

Disclosed herein are several techniques for caching dynamic web content, which are believed to improve the responsiveness of distributed web applications between clients and servers. The context within which these techniques may be applied is preferably an object-oriented software environment. Servers comprise Java Virtual Machines (JVMs) equipped with a cache, and clients communicate with servers via some type of Internet browser.

In a first embodiment of these techniques, responsiveness is improved by caching read only commands. A class of objects (i.e., cacheable commands) is defined, along with associated methods and properties. Among these are methods adapted to designate a cache, enter a command into a cache, search a cache for a specific command, etc. When a command is requested, the server responding to the request first seeks the command in its local cache. If the command is not found locally, and sharing is enabled, the command is sought in the cache of a peer server. If the command is not cached, the server executes the command and conveys the resulting HTML code to the requesting client, then caches the command. Subsequent requests for the command are serviced from the cache, which is considerably faster than re-executing the command.

In a second embodiment of these techniques, an improvement in cache capacity is obtained by eliminating redundant storage of Java Server Pages (JSPs). The main body of a JSP may contain calls to several other JSPs. The usual method of caching a JSP containing calls to other JSPs requires including a fully expanded version of each called JSP at the point in the main code from which it is called. Note that this can result in the storage of multiple copies of the called JSP, since it may be called from more than one place in the main JSP. In an exemplary embodiment of the techniques disclosed herein, the called JSPs are stored separately from the main JSP, along with links allowing the called JSPs to be located in the cache or executed. This eliminates redundancy, since only one copy of each called JSP is actually stored.

In another embodiment, server responsiveness is improved by cofetching read only commands. Special pre- Execute and postExecute methods of cacheable commands are defined, which allow an application programmer to specify additional commands to be executed by the server and returned to the client, along with the requested command. When the programmer creates a command, he prepares its preExecute method to execute the desired secondary commands and then return them (along with the requested command) to the requesting client. Similarly, the programmer configures the command's postExecute method to place all the returned commands in a cache.

Thus, a single request can be used to execute, retrieve and cache multiple related commands. The cofetched commands are chosen according to their anticipated use in conjunction with the requested command. For example, a log-on command may cofetch other user authentication commands, since they are generally required immediately after the user logs on. Command cofetching improves server responsiveness by avoiding the need to issue a separate request for every command.

In yet another embodiment, cache capacity is improved obtained by storing both server pages and commands in the same cache. Code and data structures that are the same for server pages as for commands are saved in a common area of the cache. A second area of the cache is reserved for code and data specific to server pages, and a third area is reserved for code and data specific to commands. This arrangement optimizes the use of the cache, while avoiding the need to accurately anticipate the server page-to-command cache ratio. In a preferred embodiment, the server pages comprise Java Server Pages (JSPs).

In yet another embodiment, an improvement in server responsiveness is brought about by a technique for effectively tracking dependencies between cached entries. According to this technique, each cacheable data item is assigned a data ID, and each cache entry has an associated list of data IDs for data upon which it is dependent. The data ID list makes it possible to account for indirect dependence between entries. A cache entry that indirectly depends on a data item (e.g., a JSP which calls a command that uses the data item) also lists the item's data ID among its dependencies. If the data item changes, all directly dependent and indirectly dependent entries are easily identified by means of their data ID list.

Methods and properties are introduced that utilize the data ID to manage invalidation dependencies. A metadata property of cache entries is defined, comprising a data structure used for caching an entry, locating an entry within a cache, etc. Among the components of the metadata is the list of data IDs. A cache invalidation method invalidates all cache entries with a particular data ID—i.e. all entries dependent on that data. Shared caches are accommodated by including an external cache group ID in the metadata, allowing the cache invalidation method to find and invalidate entries within a cache group.

In yet another embodiment, server responsiveness is improved by a technique for detecting and handling affinity breaks between a client and server. An affinity condition exists when a client's requests are all routed to the same server. Affinity between a client and a particular server may exist, for example, during secure online transactions. A potential problem arises, however, when the preferred server becomes temporarily unavailable, and the client's requests have to be directed to a different server. When the original server resumes operation, it must detect the fact that its affinity with the client was interrupted, and any client-specific data in its cache may be invalid.

Affinity breaks are detected through the use of an "affinity command", exchanged between the client and the server during each client request. Within the affinity command is a user ID associated with the client and a "generation ID." The user ID is unique for each client, and the generation ID is unique for each request. When a request is received from a client, the server examines the generation ID in the accompanying affinity command and compares it to its internally recorded value. If they match, the server knows it has not missed any requests. The server then updates the generation ID and sends the new value back to the client, along with the requested cache entry. If the generation ID received from the client fails to match the recorded value, an affinity break is detected, and the server updates its cache from the database. In an embodiment of the techniques disclosed herein, the affinity command is exchanged between the server and the client in the form of a "cookie." Cookies are commonly employed during client-specific web transactions to retain information for future use by the server.

In yet another embodiment, an improvement in server responsiveness is obtained by batching invalidations of cache entries. Cache invalidations require time-consuming updates of invalid cache entries from the database. Therefore, it is advantageous to combine several invalidations and execute them all at once (i.e., to batch them). According to techniques disclosed herein, cache entries may be identified or located on the basis of a unique ID. A list of IDs can be compiled by an application and consulted by a batch invalidation daemon, which uses the IDs therein to invalidate the desired entries. For example, an application can populate an invalidation table with data IDs and then call a batch invalidation daemon, which invokes an "invalidate-ById" method to invalidate any entries with that data ID in their metadata. Alternatively, a time limit property of each cache entry can be examined by a time limit invalidation daemon, to invalidate entries that have "timed out." Note that batching invalidations implies that invalid entries may remain in cache until the batch process is run. However, moderate latency in updating cached data is typically acceptable in e-business applications.

BRIEF DESCRIPTION OF THE DRAWINGS

Other objects and advantages of the invention will become apparent upon reading the following detailed description and upon reference to the accompanying drawings in which.

Figure 1:
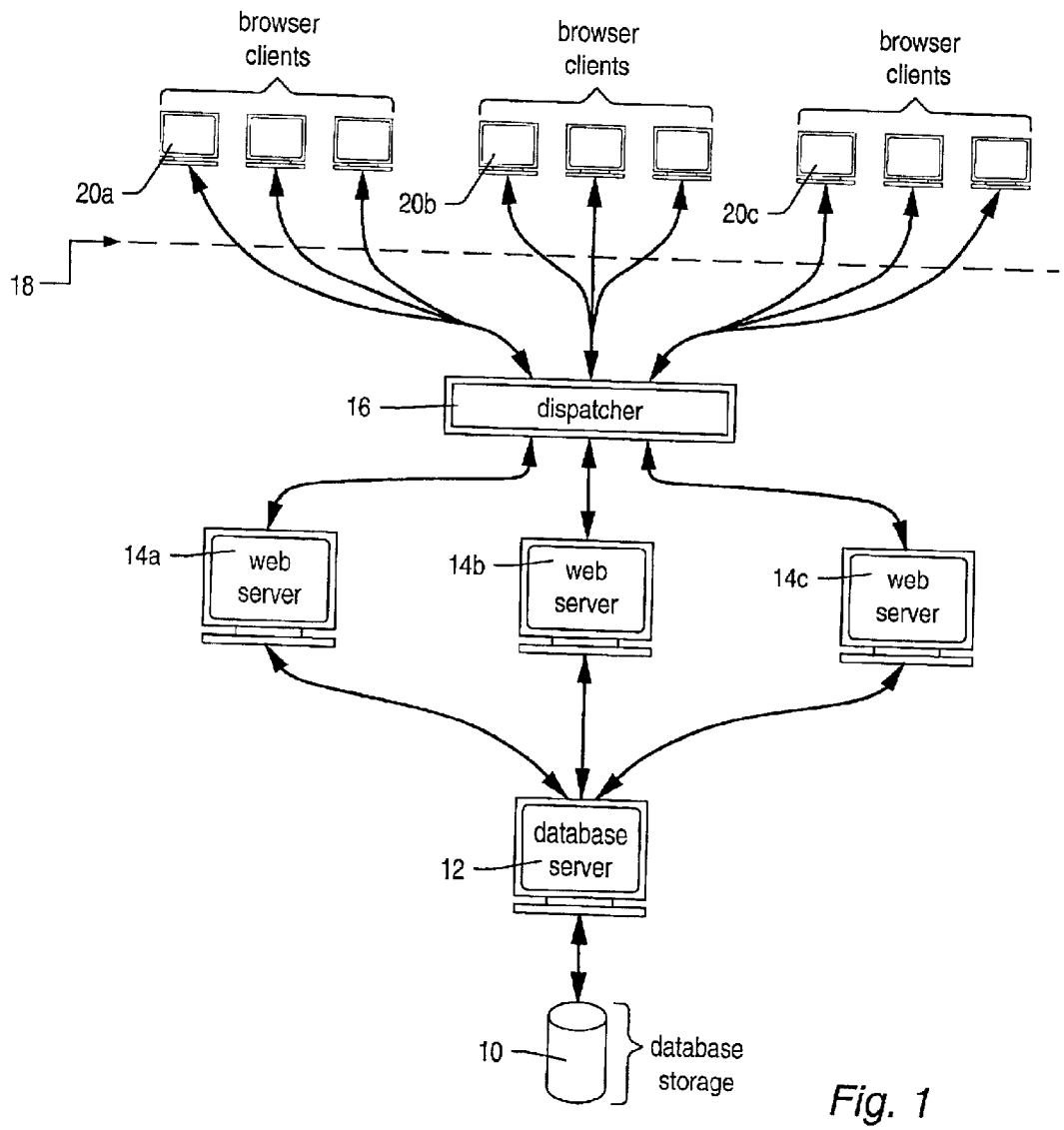
FIG. 1 shows a client-server hierarchy for a typical website.
Figure 2:
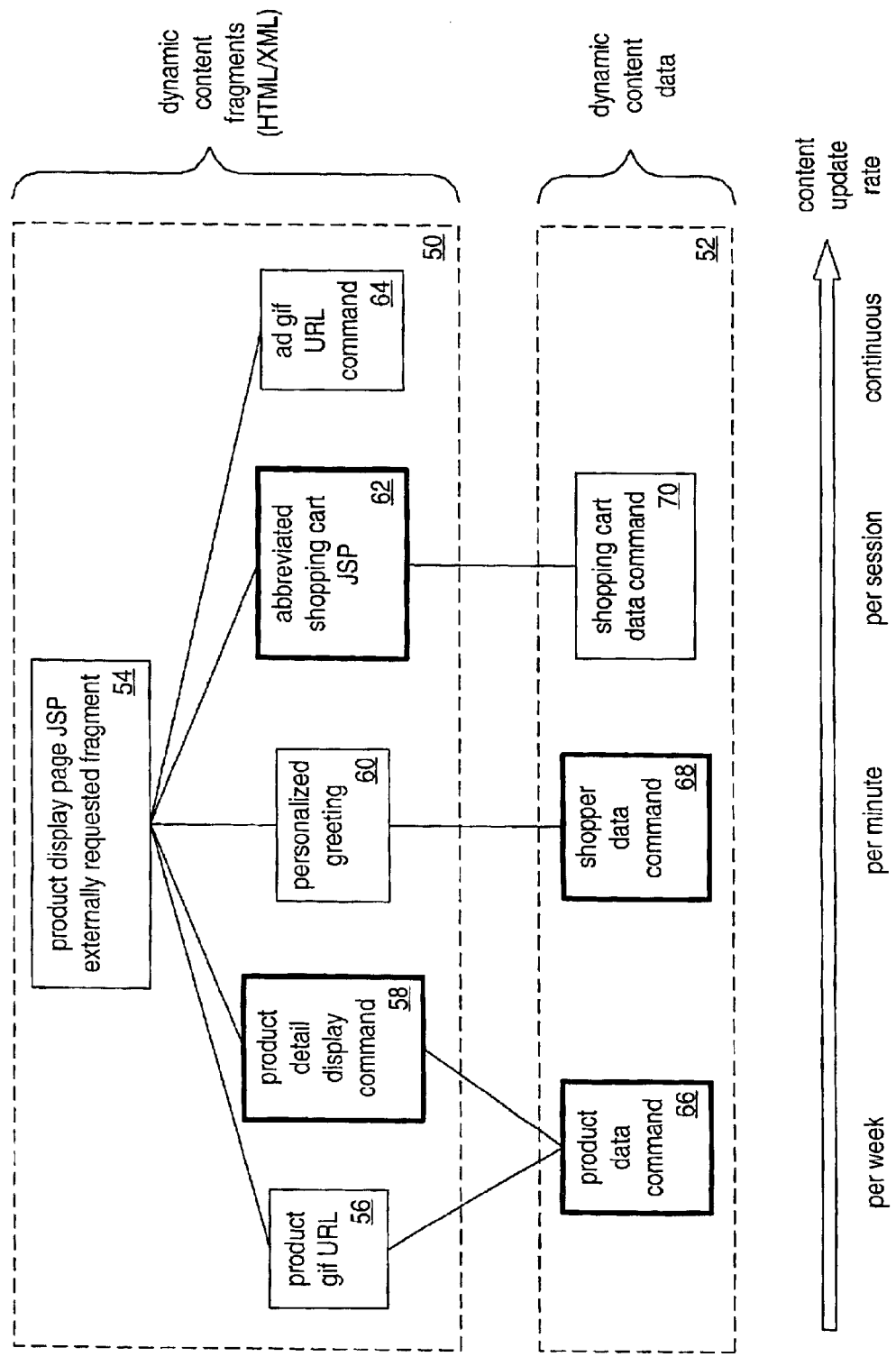
FIG. 2 illustrates the fragment and data granularity for a web page.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In recent years there has been tremendous growth in Internet traffic. This growth far exceeds the increase in the number of users, and is primarily attributable to the ever-greater dynamic content of modern web pages. E-commerce websites must supply enormous amounts of data requested by Internet shoppers browsing highly interactive web pages. Furthermore, they must do so very efficiently. The shopper should perceive the web page as sufficiently responsive—otherwise, he may direct his browser elsewhere.

An obvious response to the huge growth in Internet traffic would be for the website provider to invest in more web servers and associated hardware. However, this is a very expensive approach. A more cost effective solution is to cache web content that is frequently requested, but infrequently modified; this avoids the need to continually retrieve it from the website database. The majority of online e-business sessions consist of requests for data by the user; it is much less common for the user to send data to the database. Therefore, such "read only" transfers are very suitable for caching.

Techniques are presented herein for improving web caching performance. These improvements are brought about through increasing cache efficiency, decreasing the frequency of database accesses, increasing the speed with which cached content is conveyed to the requesting client browser, and enhancing data dependency tracking logic. A preferred embodiment for these methods is an object-oriented software environment supporting distributed web-based applications. The object-oriented software environment provides an Application Program Interface (API) for the support of applications written in Java. In this embodiment, the present techniques are implemented as methods and properties of objects, thus extending the API to allow the creation of cacheable versions of its standard objects. Within this API, a cacheable entry is represented as a CacheEntry object type, with appropriate methods and properties. The augmented API allows a web software developer to incorporate improved cache functionality into web page.

In many cases, it would be advantageous to cache a reusable command that generates HTML web content. As an alternative to caching the command itself, one may cache the fully rendered HTML—there are both advantages and disadvantages to each option. If one caches the HTML, the underlying data does not have to be rendered into HTML code for each request. On the other hand, if one caches the command, it is necessary to render the content into HTML each time it is requested, but one avoids having to access the database again each time the view changes.

As an example of the relative advantages of caching commands vs. caching HTML, consider the data captured by a command from the database describing a shopper (name, address, email, shopping cart, phone, etc.). Assume this data has multiple views:

(a) The name is used in a greeting "Hello, John! Welcome to our store."

(b) The shopping cart is used when the shopper clicks on "display shopping cart."

(c) An abbreviated shopping cart is put on every page.

If one caches data (commands), only one database access is needed for all 3 views, but reformatting is needed for each access of the same view. If one caches HTML, each of the above views would require a separate access to the database, but a second access to the same view requires no work (neither database access nor formatting) because the end result is directly cached. Note that if both data and HTML are cached, then only one database access is needed and a second access to the same view requires no work.

In an embodiment of the techniques disclosed herein for enhancing the performance of a distributed web application, CacheableCommand, a cache-aware subclass of the standard TargetableCommandImpl object class is defined. This class is characterized by additional methods, introduced specifically to facilitate caching of the command. The following Java code defines a TargetableCommandImpl object. The lines shown in boldface represent code added to impart cache functionality to the standard TargetableCommandImpl object.

```
// Subclass CacheableCommandImpl
public class ProductInfoCommand
extends TargetableCommandImpl
{
// Implement set-get methods for input and output
// properties (different for each command class)
      public void SetProductId(String productId);
      public String getProductDescriptionTable();
      public String getProductPicURL();
//    Implement TargetableCommand methods
      public void performExecute();
      public void reset();
      public boolean isReadyToCallExecute();
// Implement CacheableCommandImpl methods
      protected abstract void preparMetadata();
      public boolean preExecute (Dynacache dc) {return
true}; // optional
      public void postExecute (Dynacache dc) { }; //
optional
}
```

Figure 3:
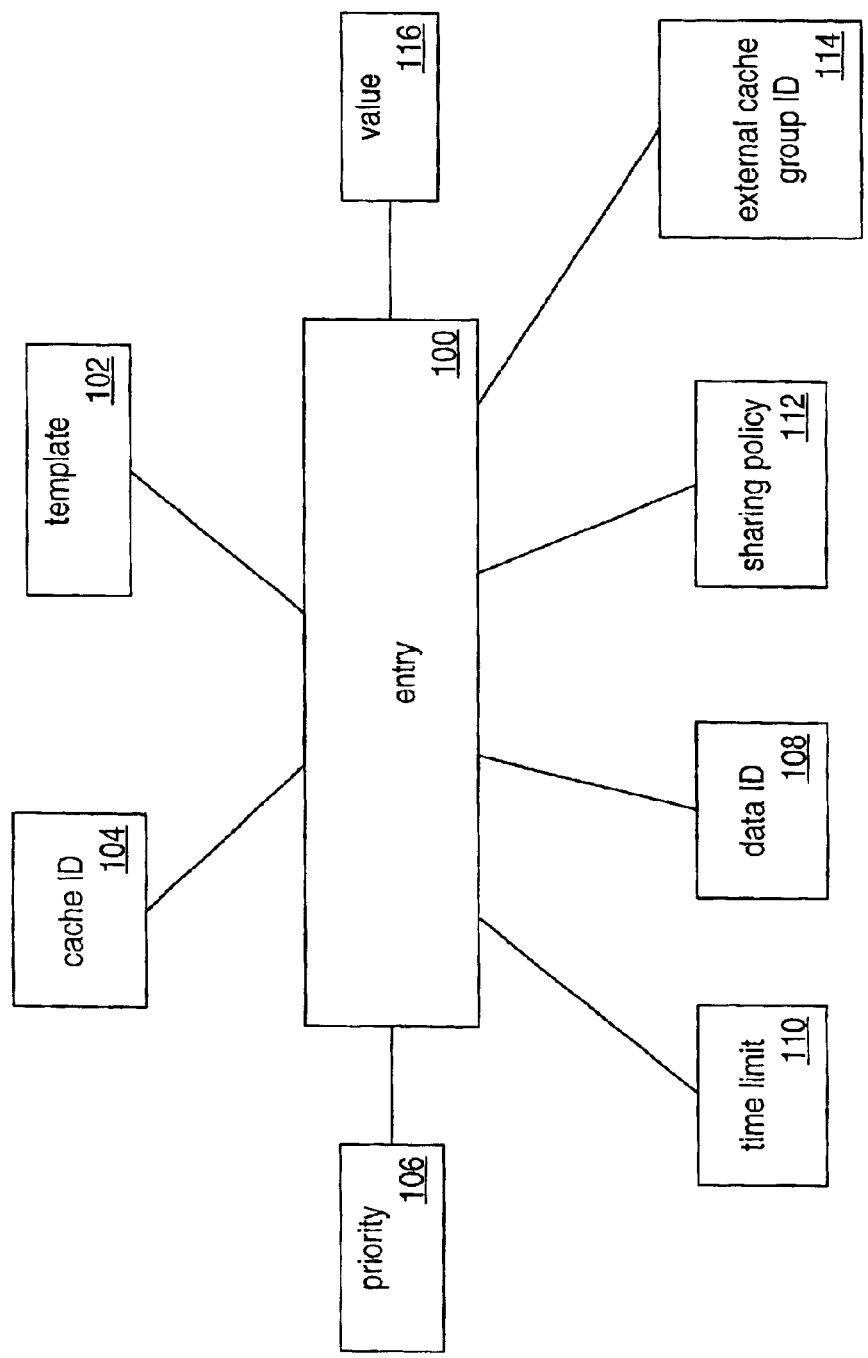
FIG. 3 shows the metadata associated with a cache entry.

According to the techniques disclosed herein, caching metadata are associated with each cacheable entry, such as a display command. This information is used by the system to manage the caching of the associated entry. FIG. 3 illustrates the metadata accompanying every cacheable entry. Associated with the entry 100 is a template 102, which is a URL (if the entry is a JSP) or a class name (if the entry is a command). A cache ID 104 identifies the entry, which must be unique within the scope of an entry. The scope may comprise a single (Java virtual machine) JVM, or a set of JVMs distributed among several servers. For example, if the entry must be unique for every combination of product ID and shopper ID, then both the product ID and the Shopper ID must be incorporated into the cache ID for the entry. A null value for the cache ID indicates that the entry should not be cached. The priority 106 of the entry determines how long the entry may remain in cache without being requested, before it is discarded. A "Least Recently Used" (LRU) algorithm removes unrequested entries from cache, and the priority setting represents the number of LRU clock cycles before the entry may be discarded. The data IDs 108 are links to the underlying data upon which the entry depends. Note that an entry may have several data IDs, corresponding to multiple dependencies. The use of data IDs permits straightforward resolution of dependencies when a cached entry is updated, and greatly simplifies the task of cache invalidation. For example, when a JSP calls a command, the command's data ID and other dependencies, along with its cache ID, are added to the JSP's list of dependencies. Then, if that command is invalidated, the dependency list reveals that the JSP must be also invalidated. A maximum time limit 110 associated with the entry specifies the time an entry may remain in cache before it is updated. For some entries, such as the company logo or greeting, this may be a matter of weeks or months. For other entries, such as the number of items in the shopping cart, the update time will be on the order of minutes. The use of a time limit simplifies the job of the web application developer. No additional application has to be written to update the cache, since it is handled automatically by the system. However, relying on the time limit can result in needlessly invalidating and reloading cache entries that are still valid. A negative time limit indicates that the entry does not time out at all, and must be explicitly invalidated by an application. A sharing policy 112 is associated with each entry for situations in which the entry may be shared across multiple JVMs. There are several sharing options:

- A NOT_SHARED option indicates that the entry is cached only locally, and may be used when client-specific data are involved. This makes it possible to establish an affinity between a particular client and server, which may be desirable, for example, when the client is conducting a secure transaction, such as making an online credit card purchase.
- A SHARED_PUSH option allows the entry to be shared across multiple JVMs. Whenever the entry is changed in one of the servers, that server "pushes" the updated entry to the other servers—whether or not they have received a request for the entry.
- With the SHARED_PULL option, a server only updates an entry in its cache if it receives a request for that entry and it exists in the cache of another server.

An external cache group ID 114 identifies external caches that are written to when an externally-requested entry is executed or invalidated, or when the entry is invalidated. Both data IDs and cache IDs are assigned by the application programmer when the respective data or cache objects are created. The value 116 of the entry is the actual executed JSP or command comprising that entry.

The application developer attaches the metadata to a read only command by implementing the prepareMetadata( ) method when the command object is defined, thereby making the command cacheable. Once the entry has been created, the application can invoke the execute( ) method, which calls the cache.setValue(entryInfo, productData) method to place it into the designated cache.

It was pointed out above that the inclusion of data IDs in the metadata for a cacheable entry simplifies the task of resolving the data dependencies of the entry. The most straightforward dependency is that of a data command on the data it encapsulates. If the command is cached and the underlying data is invalidated, the command must be invalidated as well. However, in general, the dependencies are much more complex. For example, a command may call a second command, which calls a third, etc.—if the last command in the chain is invalidated, all the rest of the commands must also be invalidated. Similarly, if a JSP calls a command that, directly or indirectly, depends on data that is invalidated, the JSP has to be invalidated, too. The potential complexity of these dependencies can make it difficult to ensure coherency among the various cached entries.

According to the techniques disclosed herein, data IDs provide a means of simplifying the invalidation of all dependent entries when the underlying data are modified. In an embodiment of these techniques, additional methods are included in the API which make use of the data IDs for this purpose. The following methods may be called from within a JSP or command, and are broadcasted to all JVMs within a distributed cache:

| | |
|---|---|
| invalidateById(id, wait): | This method invalidates the entry with the cache ID = id, or any entries having a dependency on the data ID = id. |
| InvalidateByTemplate(name, wait): | This method invalidates all instances of the command class or JSP file identified by name. |
| SetCommand(command, wait): | This method overwrites the value of the cache entry identified by command. |

The boolean wait parameter indicates whether the method should wait until the event has propagated to all the JVMs before returning.

Each caching JVM has a CacheUnit object. The following local versions of these methods operate only within a single JVM (i.e. the JVM where the call is made):

invalidateByIdLocalOnly(id, wait)
InvalidateByTemplateLocalOnly(name, wait)
SetCommandLocalOnly(command, wait).

There are a number of ways the above methods can be used to invalidate a cache entry. For example, a JSP or command that adds an item to a shopping cart could call the invalidateById method directly, referencing either the cache ID or the data ID. This call would invalidate the cached shopping cart (e.g., so that the cart could be updated with another purchase). Another possibility is to use a periodically activated daemon to invalidate all entries whose time limit has expired. Alternatively, a daemon can call the invalidateById method after consulting an invalidation table previously populated with cache or data IDs by database triggers.

As discussed earlier, it is frequently desirable to route all requests from a given user to the same web server, rather than distributing them to the next available server, as would normally be done. (This routing is typically handled by the Dispatcher 16 in FIG. 1.) This might be the case, for example, when a shopper is updating his shopping cart. If his cart is cached in a specific server, all read requests bearing his user ID are directed to that server, while writes are written through to the database. Under these circumstances, the user has established "affinity" with the server. If the designated server goes down for some reason, the user's requests may be temporarily redirected to a different server, breaking his affinity with the original server. When the original server is operational again, affinity is restored. A problem may arise however, when the user resumes communication with the original server, since there is no way to know whether the data in its cache is still valid.

An application developer can prevent this from happening by notifying the original server that affinity has been broken when it resumes operation. According to the techniques disclosed herein, a "generation ID" is associated with each user-specific request. The generation ID represents the current state of the request, and changes each time user-specific data are updated. For example, as a shopper selects products online, the generation ID would increment each time he adds anything to (or removes anything from) his cart. The generation ID is placed in a cookie that gets sent to the user each time the user's cached data is updated. Meanwhile, the server-based application with which the user is conducting his shopping transaction maintains a cached "affinity command," which combines the user ID with the generation ID. Anytime a request is received from the user, the application first checks to see if an affinity command exists bearing the same user ID and generation ID as the cookie received from the user. If the generation ID in the affinity command differs from that in the cookie, the server knows that its cache is invalid. In that case, the application invokes the invalidateById method to invalidate the cached data and any dependent commands, and retrieves the most current shopping cart data from the database. It then creates and caches a new affinity command (containing the current generation ID), and sends the generation ID and user ID in a cookie to the user.

The above technique for detecting and responding to affinity breaks may be extended to deal with finer granularity in the user-specific data. For example, multiple affinity sets (i.e. groups of commands containing user-specific data) may be defined, with each set identified by its own affinity set ID. This allows partial or selective invalidation of the cache, which may be helpful when there is a large amount of cached data, and only a portion of it has changed.

Figure 4:
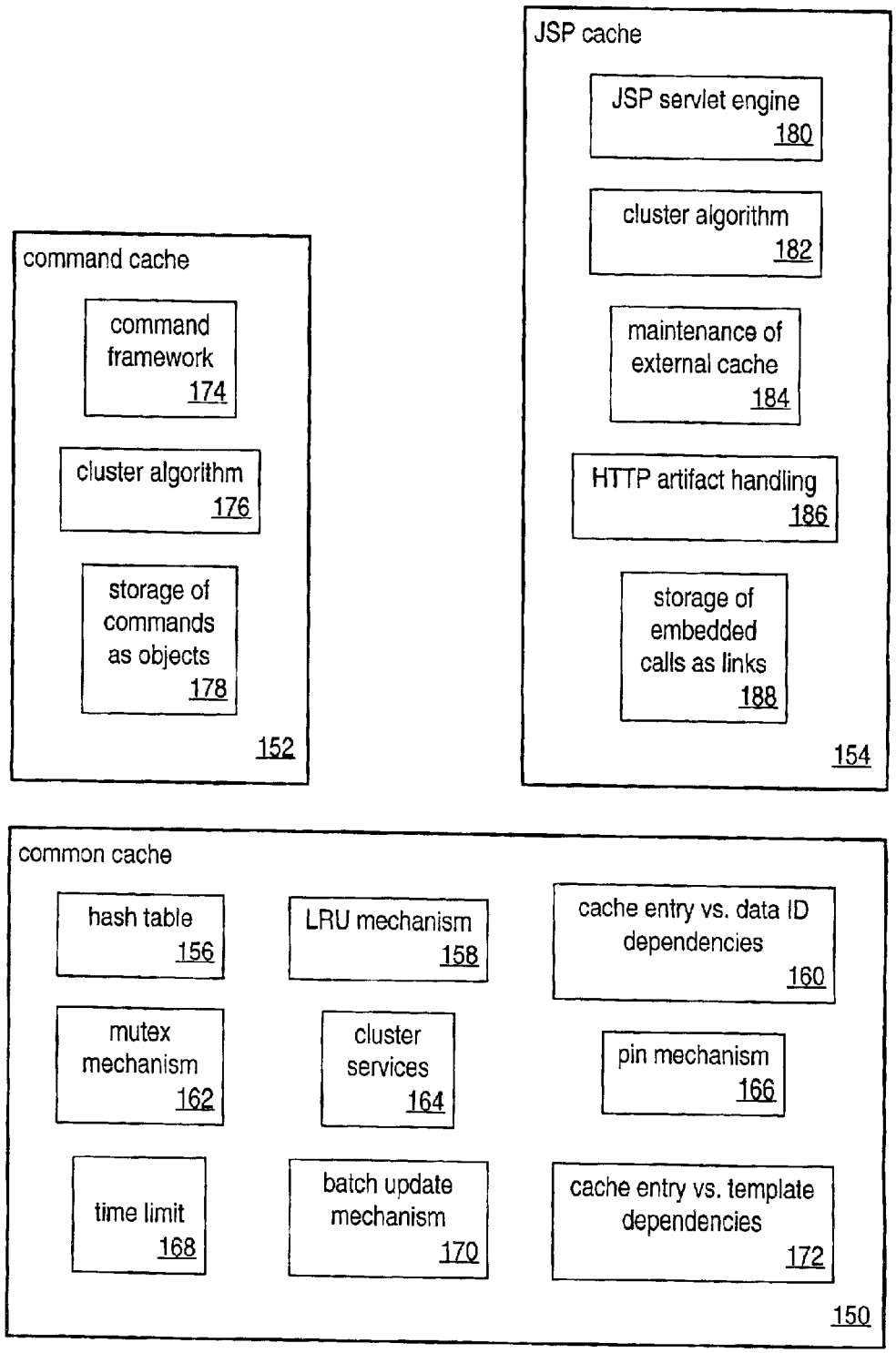
FIG. 4 illustrates the partitioning of a common cache supporting both commands and Java Server Pages (JSPs)

A further technique disclosed herein enhances cache efficiency by allowing commands and JSPs to be combined in the same cache. According to this approach, a dual-level structure is created in the cache, in which components common to both JSPs and commands are shared, while components that are distinct are implemented separately, as suggested by the block diagram in FIG. 4. Cache area 150 is used for the code elements common to both JSPs and commands, while area 152 is reserved only for code elements belonging to commands and area 154 for code elements belonging to JSPs.

The following elements share common code 150: Hash table 156 maps cache IDs onto CacheEntrys, for fast lookup. LRU mechanism 158 is a priority assignment, which determines how long the LRU algorithm waits before removing unrequested entries from the cache. The cache entry vs. data ID dependencies 160 is a list of the data IDs of cached data on which the cached JSP or command is dependent. The mutex mechanism 162 allows one application to obtain exclusive access to the cached JSP or command. The cluster services 164 send messages to other fragment cache JVMs. The pin mechanism 166 permits a user to force an entry to remain in cache, preventing the LRU algorithm from discarding it if it hasn't been requested recently; this can be used to insure that critical JSPs or commands are always cached. The time limit 168 defines the length of time an entry may remain in cache before it is invalidated. Batch update mechanism 170 makes use of global methods to update and invalidate entries en masse, avoiding the need to make multiple individual method calls. The template dependencies 172 matches each JSP or command with its template (a URL, or class, respectively), and is used for invalidation.

Some of the code elements belonging to cached commands are handled differently from those of JSPs: Code corresponding to commands is implemented in command cache 152, while code corresponding to JSPs is implemented in JSP cache 154. The command framework 174, and its JSP counterpart, the JSP servlet engine 180, operate differently, because of fundamental differences in the way commands and JSPs are programmed. Similarly, the command version of the cluster algorithm 176 differs from the JSP version 182. Both versions of this algorithm pertain to the sharing of caches among multiple JVMs. Differences between them are based on the fact that a JSP/servlet requires an extensive context supplied by the external request to execute, whereas commands are entirely self-contained and require no context. The JSP cache 154, includes code elements that perform maintenance of external caches 184 and HTTP artifact handling 186; the external caches hold entire pages, and the HTTP artifacts include headers, content length, default status and cookies. The command cache stores commands as objects 178, while the JSP cache stores calls to embedded JSPs calls as links 188.

The advantage of this cache structure is that the available total cache storage may be used by either JSPs or commands. It is often difficult to predict the distribution of JSPs vs. commands. Without shared storage, the application developer would be forced to allocate separate storage areas for the JSPs and commands. Each area would have to be large enough for the maximum anticipated number of cacheable entries. If, for example, it turned out there were many more JSPs than commands, the cache reserved for commands would be wasted, while JSPs would be starved. In contrast, by providing a common storage area for JSPs and commands, the cache can potentially be more efficiently utilized regardless of the JSP/command distribution.

Figure 5:
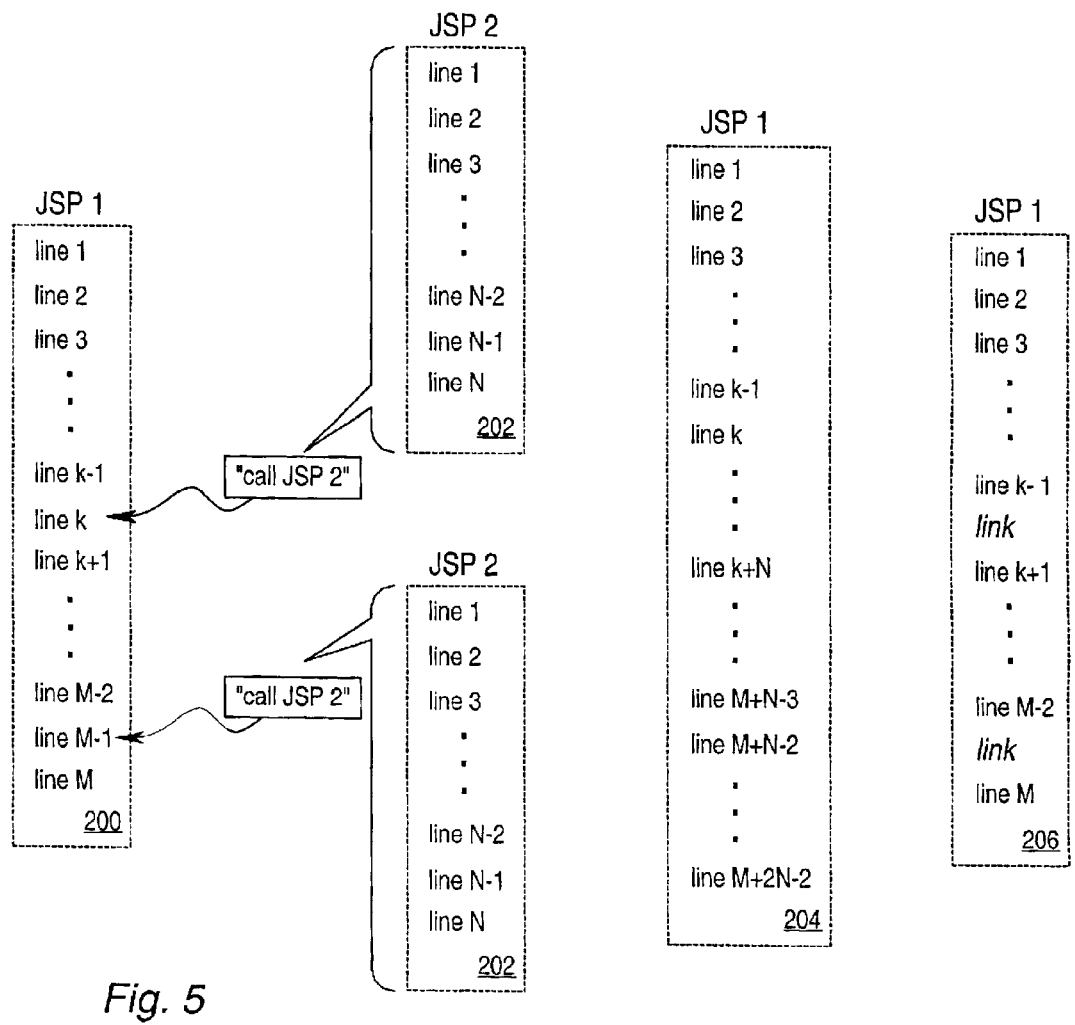
FIG. 5 illustrates the use of links as an alternative to the embedding JSPs in their completely expanded form.

Cache efficiency can be further improved by reducing the amount of cache space required to store "embedded JSPs". An embedded JSP is one that is called from within another JSP. There can be several levels of embedded JSPs (e.g., JSP #1 calls JSP #2, which calls JSP #3, etc.). Caching the JSPs in their fully expanded form, as is presently done, can result in considerable redundancy. FIG. 5 contains an illustrative example of this problem. Suppose it necessary to cache a JSP 200. Among M lines of HTML code, JSP 200 contains two calls (one at line k, and the other at line M-1) to a second JSP 202, which contains N lines of HTML. If one embeds all N lines of the child JSP 202 in the parent, a fully expanded version of the JSP 204 with M+2N-2 lines of HTML is created, N lines of which are repeated. Such redundancy represents an inefficient use of the cache. Efficiency is improved, according to the techniques disclosed herein, by caching the embedded JSPs as links, rather than as fully expanded JSPs. This version of the cached parent JSP 206 contains only M lines, and just one copy of the child JSP 202 is cached. For a child JSP, the links in the parent JSP include its template and a list of the request attributes. This information is sufficient to either find the child JSP in the cache, or to execute the child JSP without having to re-execute the parent.

In addition to improved cache efficiency, there is a further advantage to the technique of caching child JSPs as links, rather than embedding them in expanded form within the parent. Consider the case of a child JSP cached in fully expanded form within a parent. If the child JSP is invalidated, the parent JSP has to be invalidated, too. Thus, instead of merely updating the child JSP, one is forced to replace all the dependent cached content. If instead, one caches a link to the child (as in item 206 in FIG. 5), it is not necessary to update the parent when the child changes, since the link preserves the connection to the new version of the child. This reduces the cached content that has to be updated when a child JSP is invalidated and diminishes system overhead. Note that this technique is only applicable to internal caches, since external caches support only full pages, and cannot deal with child fragments.

Successive remote command calls often involve groups of related commands. For example, a command to "proceed to checkout" will probably be followed by calls for other commands that collect credit card information. The number of remote command calls could be reduced if groups of related commands could be retrieved together in a single call. A means of achieving this, according to the techniques disclosed herein, is to cofetch related commands along with a requested command in a single, combined access. This may be accomplished using preExecute and postExecute methods that extend the command object class, as described earlier. When a GetUserAuthenticationInfo command is retrieved from the server, for example, other commands that collect user information may be fetched along with it, on the assumption that these commands will be required soon after authentication. In an embodiment of this technique, the related commands would be specified by the application developer using the preExecute method of the requested command. The related commands would then be executed along with the requested command in the target server, and a reference to them returned to the client upon completion of the requested command. A postExecute method in the client would then use the references to place the related commands in the cache. Once the related commands have been cached, it is no longer necessary to make separate remote requests for them as the user proceeds with his online session.

An effective means of reducing the number of database accesses is to batch invalidations and new cache values. Instead of responding to every invalidation request or new cache values by immediately updating the cached content, invalidations and new cache values may be stored for a brief interval, following which, the updates are performed en masse, reducing the number of messages required. This approach is possible because web applications typically tolerate a significant amount of latency in updating page content. In an embodiment of the techniques disclosed herein, a batch update daemon stores all individual invalidations and new values for later batch processing. When the batch update daemon wakes, it processes all of these at once, with a single message.

A typical computer architecture of a general purpose data processing system, such as those shown in FIG. 1, in which the present invention may be implemented contains one or more central processing units (CPUs) connected to internal system bus, which interconnects random access memory (RAM), read-only memory, and input/output adapter, which supports various I/O devices, such as printer, disk units, or other devices, such as a sound system, etc. System bus also connects communication adapter that provides access to communication link. User interface adapter connects various user devices, such as keyboard and mouse, or other devices not shown, such as a touch screen, stylus, etc. Display adapter connects system bus to display device. A typical operating system may be used to control program execution within the data processing system. As such a computer architecture is well known to those skilled in the art, it is not pictured, but merely described above.

Those of ordinary skill in the art will appreciate that the hardware in which the invention is implemented may vary depending on the system implementation. For example, the system may have one or more processors, and other peripheral devices may be used in addition to or in place of the hardware menetioned above. In addition to being able to be implemented on a variety of hardware platforms, the present invention may be implemented in a variety of software and firmware embodiments.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

It will be appreciated by those skilled in the art having the benefit of this disclosure that this invention is believed to present improved techniques for caching dynamic web content. Further modifications and alternative embodiments of various aspects of the invention will be apparent to those skilled in the art in view of this description. Such details as the use of the application environment, or the Java programming language as described herein are exemplary of a particular embodiment. It is intended that the following claims be interpreted to embrace all such modifications and changes and, accordingly, the specification and drawings are to be regarded in an illustrative rather than a restrictive sense.

What is claimed is:

1. A software system supporting distributed web applications between a client and a server equipped with a cache, wherein the software system comprises:
    primary and secondary commands, which may be executed in the server in response to a request from the client;
    a metadata property, for use in instructing properties by which the commands will be cached;
    a pre-execution instruction sequence, which may be invoked when the primary command is executed, to execute one or more secondary commands and then return all the executed primary and secondary commands to the client; and
    a post-execution instruction sequence, which may be invoked after the primary command is executed, to place the one or more secondary commands returned by the pre-execution instruction sequence into the cache, along with the primary command.

2. The software system as recited in claim 1, wherein the post-execution instruction sequence further comprise:
    requesting the command from the server;
    preparing the metadata for caching the primary and secondary commands;
    executing the command in the server;
    placing the primary command in the cache of the server; and
    conveying the executed command from the server to the client.

3. The software system as recited in claim 1, wherein the one or more secondary commands executed and returned by the pre-execution instruction sequence are designated when the primary and secondary commands are created.

4. The software system as recited in claim 1, wherein the one or more secondary commands executed and returned by the pre-execution instruction sequence are commands that may be needed in conjunction with the primary command.

5. The software system as recited in claim 1, further comprising an instruction sequence whereby the primary or secondary command is entered into the cache.

6. The software system as recited in claim 1, wherein the metadata property contains a cache ID, and wherein preparing the metadata for caching comprises setting the cache ID in the metadata of the primary or secondary command to designate a specific cache.

7. The software system as recited in claim 1, further comprising an object-oriented software system.

8. The software system as recited in claim 1, wherein the server comprises a Java Virtual Machine (JVM).

9. The software system as recited in claim 1, wherein the metadata property also contains a sharing policy, which defines the manner in which the primary or secondary command in the cache of the server may be accessed by a second server.

10. A method for cofetching a plurality of commands in an object-oriented software system supporting web applications between a client and a server equipped with a cache, and the method comprises:

receiving a request for a primary command from the client;

preparing a metadata property, which encapsulates information for caching the primary command;

invoking a pre-execution instruction sequence, which, when the primary command is executed, executes one or more secondary commands and then returns the executed primary and secondary commands to the client; and invoking a post-execution instruction sequence, which, after the primary command is executed, places the one or more secondary commands returned by the pre-execution instruction sequence into the cache, along with the primary command.

11. The method as recited in claim 10, further comprising defining the one or more secondary commands that are executed and returned by the pre-execution instruction sequence when the primary command is created.

12. The method as recited in claim 11, wherein defining the one or more secondary commands further comprises selecting secondary commands that may be needed in conjunction with the primary command.

13. The method as recited in claim 10, further comprising invoking an instruction sequence to enter primary or secondary commands into the cache.

14. The method as recited in claim 10, wherein preparing the metadata property for caching comprises setting a cache ID in the metadata property, to designate a specific cache.

15. The method as recited in claim 10, wherein the software system comprises an object-oriented software system.

16. The method as recited in claim 10, wherein the server comprises a Java Virtual Machine (JVM).

17. The method as recited in claim 10, further comprising defining a sharing policy component within the metadata property, which dictates the manner in which the primary or secondary command present in the cache of the server may be accessed by a second server.

18. A system including processor and memory for cofetching commands in a web application between client and server, comprising:

a cache;

means for receiving a request for a primary command from the client;

means for preparing a metadata property, which encapsulates information for caching the primary command;

means for invoking a pre-execution instruction sequence, which, when the primary command is executed, executes one or more secondary commands and then returns the executed primary and secondary commands to the client; and means for invoking a post-execution instruction sequence, which, after the primary command is executed, places the one or more secondary commands returned by the pre-execution instruction sequence into the cache, along with the primary command.

19. A computer program product in a computer readable medium for cofetching commands in a web application between client and server, comprising:

means for receiving a request for a primary command from the client;

means for preparing a metadata property, which encapsulates information for caching the primary command;

means for invoking a pre-execution instruction sequence, which, when the primary command is executed, executes one or more secondary commands and then returns the executed primary and secondary commands to the client; and means for invoking a post-execution instruction sequence, which, after the primary command is executed, places the one or more secondary commands returned by the pre-execution instruction sequence into the cache, along with the primary command.

* * * * *